United States Patent [19]
Schmucker et al.

[11] Patent Number: 5,525,306
[45] Date of Patent: Jun. 11, 1996

[54] GAS GENERATOR SYSTEM

[75] Inventors: Robert Schmucker, Ottobrunn; Josef V. Simon, Olching; Ruth Fendt-Edelberg, Ottobrunn; Ernst Högenauer, Lochham, all of Germany

[73] Assignee: TEMIC Bayern-Chemie Airbag GmbH, Aschau/Inn, Germany

[21] Appl. No.: 133,661

[22] PCT Filed: Mar. 16, 1993

[86] PCT No.: PCT/EP93/00603

§ 371 Date: Oct. 7, 1993

§ 102(e) Date: Oct. 7, 1993

[87] PCT Pub. No.: WO93/18940

PCT Pub. Date: Sep. 30, 1993

[30] Foreign Application Priority Data

Mar. 19, 1992 [DE] Germany ................. 42 08 844.5
Mar. 19, 1992 [DE] Germany ................. 42 08 843.7

[51] Int. Cl.[6] .............................................. B01J 7/00
[52] U.S. Cl. ...................... 422/165; 280/741; 422/305
[58] Field of Search .................................. 422/164, 165, 422/166, 167, 305; 280/736, 741, 742; 102/530, 531

[56] References Cited

U.S. PATENT DOCUMENTS

| | | |
|---|---|---|
| 3,944,251 | 3/1976 | Lynch . |
| 3,985,076 | 10/1976 | Schneiter et al. . |
| 3,986,456 | 10/1976 | Doin ........................... 422/167 |
| 4,013,010 | 3/1977 | Schneiter et al. ............ 102/39 |
| 4,131,299 | 12/1978 | Ono et al. . |
| 4,547,342 | 10/1985 | Adams et al. ............... 422/305 |
| 4,561,675 | 12/1985 | Adams et al. ............... 280/741 |
| 4,578,247 | 3/1986 | Bolieau et al. .............. 422/165 |
| 4,590,041 | 5/1986 | Hill .............................. 422/165 |
| 4,943,086 | 7/1990 | Cunningham ............... 280/741 |
| 5,000,479 | 3/1991 | Werner ........................ 280/741 |
| 5,114,179 | 5/1992 | Emery et al. ................ 280/741 |
| 5,139,280 | 8/1992 | Cord et al. .................. 422/165 |
| 5,149,129 | 9/1992 | Unterforsthuber et al. . 422/166 |
| 5,204,068 | 4/1993 | O'Loughlin et al. . |
| 5,215,721 | 1/1993 | Tasaki et al. ................ 422/165 |
| 5,259,643 | 11/1993 | Kraft et al. .................. 280/741 |
| 5,259,649 | 11/1993 | Albrecht et al. ............ 280/741 |
| 5,273,722 | 12/1993 | Hogenauer et al. ........ 422/164 |

FOREIGN PATENT DOCUMENTS 7438377 10/1979 Germany .
4141906A1 7/1992 Germany .

*Primary Examiner*—Peter Kratz
*Attorney, Agent, or Firm*—McGlew and Tuttle

[57] ABSTRACT

Gas generator system of lightweight design, especially of an impact protection system for occupants of vehicles, containing a central area with an igniter for a combustion chamber enclosing the igniter for solid propellant, which combustion chamber in turn is enclosed by a filter chamber with discharge openings for inflating a downstream receiver, containing, in combination: a housing, consisting of an upper part and a lower part, which are screwed together, and which accommodate and hold between them the igniter, the propellant, and the filter, so that they are sealed tightly and in a pressure-proof manner from the outside, and that one of the two housing parts that can be connected to one another has an approximately mushroom-shaped cross section, as well as special filter designs and brackets for holding same during screwing together, and the selected ducting for the flow of the gas generated.

10 Claims, 1 Drawing Sheet

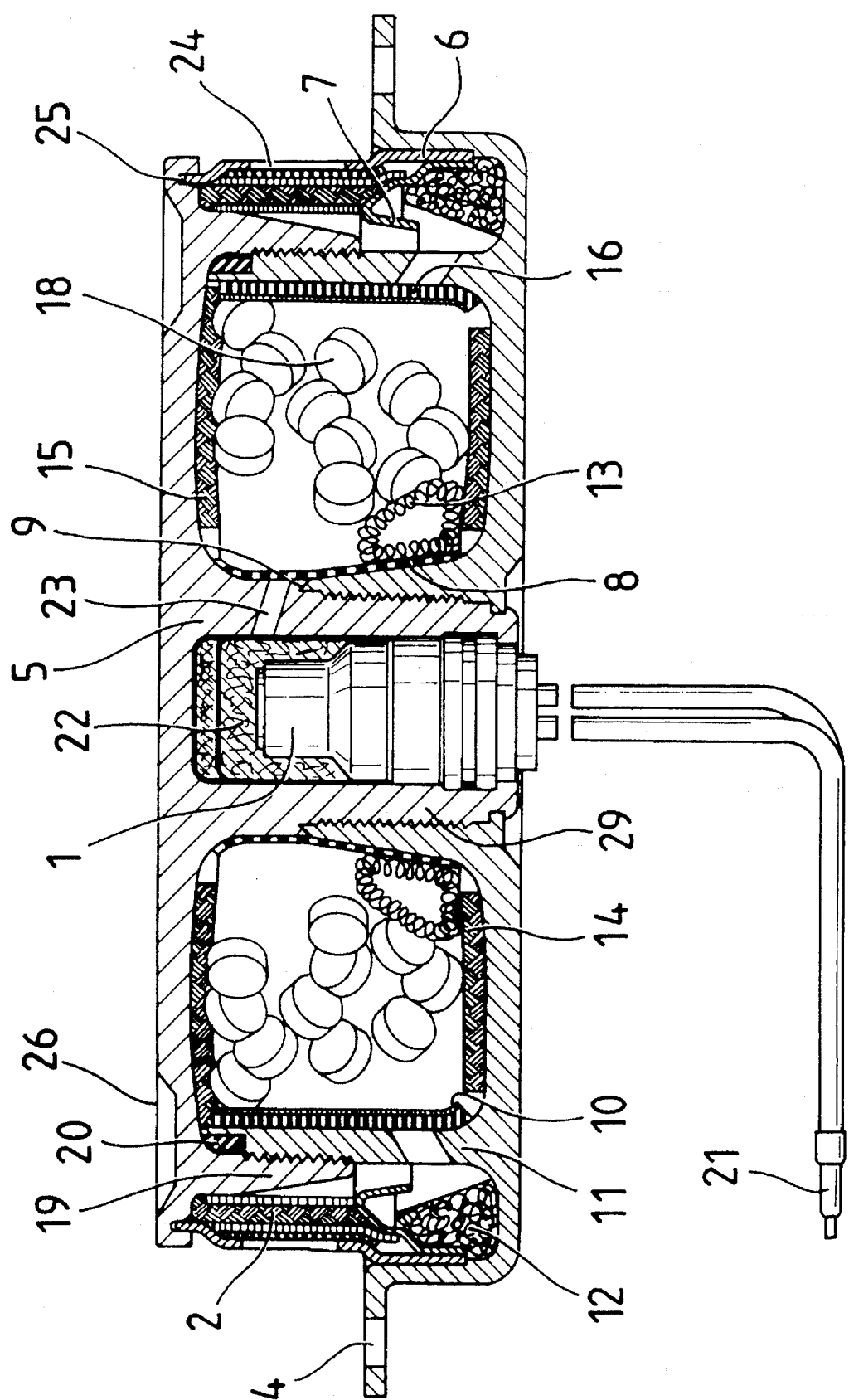

5,525,306

GAS GENERATOR SYSTEM

FIELD OF THE INVENTION

The gas generator according to the present invention is intended for a protective device for occupants of motor vehicles, which device has a filter chamber with filters for the gas flow being discharged, wherein the filter chamber is connected to the propellant chamber and communicates with it through openings.

BACKGROUND OF THE INVENTION

Such gas generators have been known (cf., e.g., the Assignee's German Patents 39,21,472 and 39,21,473).

SUMMARY AND OBJECTS OF THE INVENTION

The object of the present invention is to deviate from the basis of the sheet metal design, on which these and other prior-art gas generators are based, and yet to meet the requirements, some of which are conflicting, namely, a) absolute tightness over a longer period of time, b) pressure resistance for a high working pressure, c) blowing out of a clean gas, which is cooled compared with the combustion chamber temperature, from the blow-out openings on the circumference, d) light weight, and e) low manufacturing costs.

The preferred application of the present invention is in gas generators which are mounted, together with an air bag, in a steering wheel of a motor vehicle in order to protect, e.g., a driver in the case of an impact, after ignition initiation by a deceleration-sensitive switch.

According to the invention, a gas generator system of light weight design is provided particularly for use as a protection system for vehicle occupants. The gas generator is formed with a central area with an igniter communicating with a combustion chamber for solid propellant. The combustion chamber encloses the central area and the combustion chamber is in turn enclosed by a filter chamber. The filter chamber includes discharge openings for inflating a gas receiver element (such as an air bag) arranged down stream.

The gas generator is formed of an essentially torodial housing including an upper part and a lower part which are screwed together. The upper and lower parts accommodate and hold between them the igniter, the propellant and the filter and are sealed from the outside in a tight and pressure proof manner. The upper part of the housing has an approximately mushroom-shaped cross section forming a hollow stem or core area for receiving the igniter, the core area including a screw connection portion for screwing the core area together with the housing lower part. The approximately mushroom-shaped part of the housing upper part being screwed together with the housing lower part at the threaded portion at a circumference of the stem of the housing upper part and additionally being screwed together at another circumferential area, located radially outwardly from the circumference of the stem.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

While a specific embodiment of the invention has been shown and described in detail to illustrate the application of the principles of the invention, it will be understood that the invention may be embodied otherwise without departing from such principles.

The housing of the gas generator according to the invention consists of light metal and is prepared especially according to injection molding, diecasting, or extrusion processes with two parts 4 and 5, which are connected to each other essentially by thread connection, wherein one of the parts forms a lower part and the other forms an upper part. The upper part 5 is approximately mushroom-shaped, while the lower part can be described as being of a cup-shaped or tray-shaped design.

The upper part 5 has a central stem, which is hollow for accommodating an igniting unit 1. The igniting unit is connected via a plug 21 to an electrical triggering circuit, which sends a signal for igniting an electrical igniter 1 after recognition of an impact via a switch responding to a defined deceleration, wherein the electrical igniter may be, e.g., a heating wire, which ignites an igniting means 22 that is located in the hollow space of the stem of the upper part 5 and may in turn be sealed or packaged, as shown, and whose packaging bursts at a defined pressure in order to then allow a flame to propagate at holes 23 into the propellant chamber for the pellets 18, here of annular shape. This chain of ignition is not limited to two propellants, but such a chain of ignition may also be formed by more than two substances. The lower part has an innermost wall, formed by wall parts 8, which enclose the central area or stem of the upper part 5 and can be screwed onto same by means of threads.

The lower part or cup 4 also has another ring, located farther on the outside, with the wall area 11, which in turn can be screwed together with a wall area 19 of the upper part 5 via threads. The lower part or tray 4 can in turn be attached peripherally outside to a bracket of the steering wheel by means of screws, likewise simultaneously with the interposition of the air bag as an inflatable bag with its lowermost edge zone.

The wall areas in the lower part 4 and the upper part 5, which are screwed together, have not only common threads inside and outside, but also tapered tips, which are pressed into or press the other part, if desired, via a deformable ring 20, whose shape, size, and material are selected such as to ensure suitable sealing. In addition, the pitch and design of the threads can be selected to be such that these firmly interlock (nondetachable thread connection). The threads may also be designed, at least partially, as self-cutting threads. The wall areas to be screwed together may be designed partially as elastic or flexible or slotted, just like, e.g., other sleeves or linings. The solid propellant is filled into the said propellant chamber in the form of, e.g., pellets 18 on pads 15, especially a nonwoven ceramic fiber material. It would also be possible to use another suitable, temperature-resistant and flexible material as a damping pad 14 or 15 at the bottom and/or at the top. If the pellet charge does not or is not supposed to completely fill the space, volume equalization can be ensured with metal wool inserts 13. The discharge or overflow openings of the propellant chamber are designated by reference numeral 16; these openings extend radially from the inside to the outside toward the circumference, but are arranged, when viewed in their circumference, obliquely toward the central axis. The openings 16 are oriented such that the gas flow from the propellant chamber directly reaches a metal wool element 12 in the separation chamber in which liquid and solid particles are separated from the gas. Liquid particles begin to condense already at the coarse filter 10 in the propellant chamber in front of the passage openings 16. The coarse filters 10 may be relatively wide-meshed screens, gratings or the like, preferably additionally covered with a somewhat softer, finer fabric toward the inside, i.e., toward the propellant. Both the openings 16 for the overflow of the gas from the propellant chamber into the filter and separation chamber, and the blow-out openings 24 may be sealed on the inside with thin bursting films in the known manner in order to prevent moisture from penetrating from the outside.

The two main parts 4 and 5 are screwed together by means of tool holding fixtures 26 on the upper part 5 in order to introduce the necessary force for screwing together. All propellants and filters must be inserted beforehand in order for all parts to be clamped in tightly and in a pressure-proof manner by means of the thread connection in a single operation. Tightness under atmospheric pressure is ensured for several years, and the bursting pressure or working pressure can be set depending on the requirements, excess pressure being especially >300 atm or $3 \times 10^4$ Megapascal, and the excess temperature is especially > ca. 250° C.

Reference numeral 7 designates a guide plate for the flow, which is located in the filter chamber in the downstream direction behind the opening 16 and behind the glass wool filter 12, through which the gas flows, to separate the particles and to condense liquid on the surface. The guide plate 7 is shaped, on the one hand, such as to deflect the flow even multiple times and to duct the flow ill the filter chamber, and on the other hand, such as to form a channel in the discharge direction, which distributes the gas over the filter surface of the fine filter 2. The fine filter 2 is in contact with the guide plate 7, on the one hand, and is clamped or crimped in a groove 25 on the outer circumference of the upper part 5, or is fixed in another manner by deformation after insertion of the filter 2 at 25. The fine filter 2 is in contact, on the other hand, with a retaining plate 6, with the end of which it can be plugged into the groove 25 and it can be inserted at the other end into the tray 4. The retaining plate 6 and the sandwich-like metal-ceramic-metal filter together form a unit/module 2.

As is shown in the drawing, the stem of the upper part 5 is deformable at its lower end, e.g., with a riveting or another, similar shaping tool, such that the igniter 1 is held absolutely tightly therein. An additional fastening of this type can also be performed at the inner or outer end of the tray 4. Part of the thread section may be eliminated under certain circumstances in this case, especially at the stem of the upper part 5. Further fastening can be achieved by means of adhesive or other securing means of prior-art type, such as insets, claws, pins, etc., and lock nuts, e.g, at the lower end of the stem of the upper part 5.

Further variants of the exemplary embodiment are easily possible for the person skilled in the art within the framework of the claims.

We claim:

1. A gas generator for impact protection systems for vehicle occupants, comprising:

an essentially torodial housing formed of a housing upper part and a housing lower part, said housing upper part having an inner wall with flow passages and having an outer wall and said housing lower part having an inner wall and having an outer wall with outlet flow passages, said inner walls defining an igniter chamber and a region between said inner walls and said outer walls defining a propellant chamber whereby an essentially radial principal direction of flow may be established, from inside said inner walls to outside said outer walls, said housing lower part having a tray portion defining a filter receiving space, opposite said outlet flow passages, an overhang portion of said housing upper part extending over said tray portion, said inner housing walls each having threaded portions and said outer housing walls each having threaded portions for connecting said housing upper part and said housing lower part;

an igniter positioned in said igniter chamber;

solid propellant positioned in said propellant chamber;

coarse filter means positioned within said propellant chamber adjacent said outer wall flow passages for initiating condensation of components of generated gas;

a guide plate positioned in said filter space and cooperating with said housing lower part tray portion to form a separation chamber opposite said outlet flow passages, said guide plate for directing the gas flow;

a fine filter cooperating with a retaining plate to form a retaining plate and filter module, said retaining plate being positioned so that said retaining plate is held between said tray portion and said overhang portion upon screwing together corresponding threaded portions of said housing upper part and said housing lower part to connect said housing upper part and said housing lower part and to fix said fine filter above said tray portion, wherein said fine filter is pressed at an upper end between said retaining plate and an outer surface portion of said housing upper part outer wall and a lower end is pressed between said retaining plate and guide plate.

2. Gas generator according to claim 1, wherein said fine filter includes two outer layers and an inner thicker ceramic fiber insert of non-woven ceramic material.

3. A gas generator according to claim 1, wherein metal wool is arranged in said separation chamber for condensing and separating solid particles from propellant gas and said guide plate and said outlet flow passages form ducting means for ducting gas flow such that gas is discharged from said propellant chamber and first reaches said metal wool as a turbulent flow and after being deflected by said guide plate is forced to flow into a discharge channel to said fine filter.

4. A gas generator according to claim 1, wherein said guide plate is designed as a partition between said separation chamber and said fine filter, said fine filter being located downstream of said guide plate.

5. A gas generator according to claim 1, wherein said retaining plate cooperates with said tray portion and said overhang portion to define a filter chamber.

6. A gas generator for impact protection systems for vehicle occupants, comprising:

an essentially torodial housing formed of a housing upper part and a housing lower part, said housing upper part having an inner wall with flow passages and having an outer wall and said housing lower part having an inner wall and having an outer wall with outlet flow passages, said inner walls defining an igniter chamber and a region between said inner walls and said outer walls defining a propellant chamber whereby an essentially radial principal direction of flow may be established, from inside said inner walls to outside said outer walls, said housing lower part having a tray portion defining a filter receiving space, opposite said outlet flow passages, an overhang portion of said housing upper part extending over said tray portion, said inner housing wails each having threaded portions and said outer housing walls each having threaded portions for connecting said housing upper part and said housing lower part;

an igniter positioned in said igniter chamber;

solid propellant positioned in said propellant chamber;

coarse filter means positioned within said propellant chamber adjacent said outer wall flow passages for initiating condensation of components of generated gas;

a guide plate positioned in said filter space and cooperating with said housing lower part tray portion to form a separation chamber including metal wool for condensation and separating out solid particles frown the generated gas, said guide plate directing the gas flow;

a fine filter cooperating with a retaining plate to form a plate and filter module, said retaining plate being positioned so that said retaining plate is held between said tray portion and said overhang portion upon screwing together corresponding threaded portions of said housing upper part and said housing lower part to connect saint housing upper part and said housing lower part and to fix said fine filter above said tray portion, with an upper end of said fine filter pressed between said retaining plate and an outer surface portion of said housing upper part outer wall and with a lower end of said fine filter pressed between said retaining plate and said guide plate, said retaining plate having a blow out opening adjacent said fine filter, between said pressed upper end and said pressed lower end.

7. A gas generator according to claim 6, wherein said guide plate and said outlet flow passages form ducting means for ducting gas flow such that gas is discharged from said combustion chamber and first reaches said metal wool as a turbulent flow and after being deflected by said guide plate is forced to flow into a discharge channel to said fine filter.

8. A gas generator according to claim 6, wherein said guide plate is designed as a partition between said separation chamber and said fine filter, said fine filter being located downstream of said guide plate.

9. A gas generator according to claim 6, wherein said fine filter includes two outer layers and an inner thicker ceramic fiber insert of non-woven ceramic material.

10. A gas generator according to claim 6, wherein said retaining plate cooperates with said tray portion and said overhang portion to define a filter chamber.

* * * * *